(12) United States Patent
Ansorregui et al.

(10) Patent No.: US 10,101,800 B2
(45) Date of Patent: Oct. 16, 2018

(54) METHOD OF MANAGING POWER AND ELECTRONIC DEVICE

(71) Applicant: SAMSUNG ELECTRONICS CO., LTD., Suwon-si (KR)

(72) Inventors: Daniel Ansorregui, Middlesex (GB); Marco Starace, Middlesex (GB); Ramesh Munikrishnappa, Middlesex (GB); Zeeshan Anwar, Middlesex (GB); Karthikeyan Saravanan, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 15/223,396

(22) Filed: Jul. 29, 2016

(65) Prior Publication Data

US 2017/0031430 A1 Feb. 2, 2017

(30) Foreign Application Priority Data

Jul. 29, 2015 (GB) .................................. 1513348.1
Mar. 3, 2016 (KR) ......................... 10-2016-0025762

(51) Int. Cl.
*G06F 9/00* (2006.01)
*G06F 1/32* (2006.01)

(52) U.S. Cl.
CPC .......... *G06F 1/3287* (2013.01); *G06F 1/3203* (2013.01); *G06F 1/324* (2013.01); *G06F 1/3206* (2013.01); *G06F 1/3296* (2013.01); *Y02D 10/126* (2018.01); *Y02D 10/172* (2018.01)

(58) Field of Classification Search
CPC ..... G06F 1/3287; G06F 1/3203; G06F 1/3206
USPC ........ 713/320, 340, 100, 323, 300; 718/104; 700/299; 709/226; 1/1
See application file for complete search history.

(56) References Cited

U.S. PATENT DOCUMENTS

| | | | | |
|---|---|---|---|---|
| 8,745,626 B1 * | 6/2014 | Sandstrom | ............ | G06F 9/5027 709/226 |
| 8,869,158 B2 | 10/2014 | Prabhakar et al. | | |
| 8,996,890 B2 * | 3/2015 | Cox | ....................... | G06F 1/3203 713/300 |
| 9,772,670 B2 * | 9/2017 | Yu | ......................... | G06F 1/3296 |
| 9,891,692 B2 * | 2/2018 | Choi | ...................... | G06F 1/325 |

(Continued)

OTHER PUBLICATIONS

Communication dated Dec. 1, 2015, issued by the Intellectual Property Office of the United Kingdom in counterpart application No. GB1513348.1.

(Continued)

*Primary Examiner* — Aurel Prifti
(74) *Attorney, Agent, or Firm* — Sughrue Mion, PLLC

(57) ABSTRACT

Provided is a method of managing power of an electronic device. The method includes: obtaining operation information related to an operation from among operations performed by the electronic device. The operation is recognizable to a user via a product of hardware processing performed by hardware included in the electronic device. The method also includes obtaining load information related to a load generated by the operation performed by the electronic device. In addition, the method includes performing power management on the hardware included in the electronic device based on the operation information and the load information.

12 Claims, 18 Drawing Sheets

(56) References Cited

U.S. PATENT DOCUMENTS

| | | | | |
|---|---|---|---|---|
| 2006/0266629 | A1* | 11/2006 | Yu | H01H 13/705 200/5 A |
| 2008/0201591 | A1* | 8/2008 | Hu | G06F 1/3203 713/323 |
| 2009/0309885 | A1* | 12/2009 | Samson | G06F 1/3203 345/519 |
| 2011/0109624 | A1* | 5/2011 | Greenberg | G06F 1/3203 345/419 |
| 2013/0139170 | A1* | 5/2013 | Prabhakar | G06F 9/4893 718/104 |
| 2013/0297094 | A1* | 11/2013 | Yao | G05D 23/19 700/299 |
| 2013/0328890 | A1* | 12/2013 | Avkarogullari | G06F 1/206 345/501 |
| 2014/0164757 | A1* | 6/2014 | Dorsey | G06F 1/324 713/100 |
| 2014/0173311 | A1* | 6/2014 | Park | G06F 1/206 713/320 |
| 2014/0184619 | A1* | 7/2014 | Kim | G06T 1/20 345/519 |
| 2014/0215253 | A1* | 7/2014 | Klassen | G06F 1/3206 713/340 |
| 2014/0359324 | A1* | 12/2014 | Park | G09G 5/00 713/320 |
| 2015/0015589 | A1* | 1/2015 | Chung | G06F 1/324 345/501 |
| 2015/0346798 | A1* | 12/2015 | Dongara | G06F 1/3206 713/320 |
| 2017/0116966 | A1* | 4/2017 | Brabender | G09G 5/363 |

OTHER PUBLICATIONS

Communication dated Dec. 2, 2016, issued by the European Patent Office in counterpart European Application No. 16181942.0.
Communication dated Dec. 20, 2016, issued by the European Patent Office in counterpart European Application No. 16181942.0.

* cited by examiner

METHOD OF MANAGING POWER AND ELECTRONIC DEVICE

CROSS-REFERENCE TO RELATED APPLICATIONS

This application claims priority from U.K. Patent Application No. 1513348.1, filed on Jul. 29, 2015, in the U.K. Intellectual Property Office, and Korean Patent Application No. 10-2016-0025762, filed on Mar. 3, 2016, in the Korean Intellectual Property Office, which are incorporated herein in their entirety by reference.

BACKGROUND

1. Field

The present disclosure relates to methods of managing power and electronic devices, and more particularly, to a method of managing power and electronic device based on operation information related to an operation recognizable to a user.

2. Description of the Related Art

With the development of electronic device-related technology, one device is able to perform a variety of functions, and such a device includes various pieces of hardware for supporting the variety of functions. As the various pieces of hardware are included in the device, the importance of power management of each piece of hardware is increasing.

Hardware power management is performed via various methods, for example, by enabling or disabling certain hardware modules, increasing or decreasing performance of various hardware modules, and changing a hardware operating property, such as a frequency or a voltage. As described above, because various pieces of hardware included in the device involve complex operations, it may be difficult to achieve sufficient reduction in power consumption merely by performing power management on one piece of hardware. Accordingly, a method of managing power may be modified according to usage scenarios of different pieces of hardware. A specific example of such a method of managing power includes advanced power management (APM) developed by Intel and Microsoft and supported and used by Linux kernels.

Dynamic voltage and frequency scaling (DVFS) is one of a number of methods for performing power management. DVFS may control a voltage and/or a frequency of hardware to increase or decrease according to settings. Generally, when performance needs to be increased, such as when a processing load increases, the voltage and/or the frequency of the hardware may be raised. On the other hand, when power consumption needs to be decreased, the voltage and/or the frequency of the hardware may be lowered. DVFS may be particularly useful in battery-powered devices, such as laptops, tablets, or mobile phones, to conserve power.

However, there are limitations to DVFS according to general principles of electronic technology. In general, an increase in frequency creates an increase in power and an increase in performance of hardware. However, while a performance increase and frequency and/or voltage increases are linear, an increase in power is a squaring function. Accordingly, performance and power consumption of the hardware may become out of balance under certain circumstances.

In addition, since DVFS, according to general principles of electronics, operates based on a hardware device, it is difficult to control a frequency and/or a voltage based on an application domain or an application output.

Accordingly, a conventional method of managing power may attempt to make contradictory decisions under certain circumstances or may lead to fluctuations undesirable in the hardware's performance or power consumption, thus leading to the hardware becoming overheated or having low performance.

SUMMARY

One or more exemplary embodiments provide methods of managing power and electronic devices based on operation information related to an operation recognizable to a user. According to the disclosed embodiments, performance or power consumption of hardware may be balanced.

According to an aspect of an exemplary embodiment, a method of managing power of an electronic device may include: obtaining operation information related to an operation from among operations performed by the electronic device, where the operation is recognizable to a user via a product of hardware processing performed by hardware included in the electronic device; obtaining load information related to a load generated by the operation; and performing power management on the hardware included in the electronic device based on the operation information and the load information.

According to an aspect of another exemplary embodiment, an electronic device may include: hardware configured to execute a process; an output unit configured to output a process result of the hardware to a user; and a controller configured to obtain operation information related to an operation from among operations performed by the electronic device where the operation is recognizable to the user via the process result of the hardware, obtain load information related to a load generated by the operation, and perform power management on the hardware based on the operation information and the load information.

BRIEF DESCRIPTION OF THE DRAWINGS

The above and other aspects will become apparent and more readily appreciated from the following description of the embodiments, taken in conjunction with the accompanying drawings in which.

DETAILED DESCRIPTION

Figure 1:
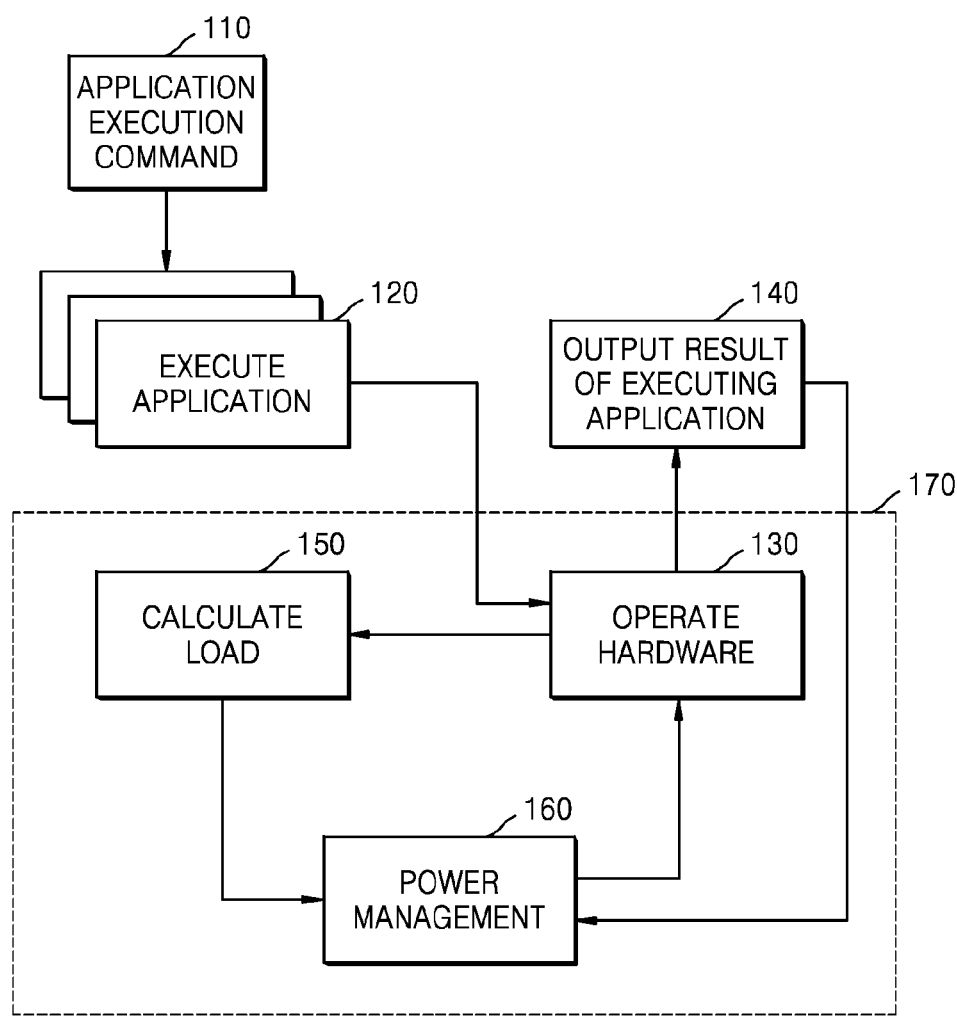
FIG. 1 is a diagram showing an exemplary method of managing power.

Advantages and features of one or more embodiments and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims. Like reference numerals refer to like elements throughout the specification.

Moreover, it should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example.

The word "exemplary" is used herein to mean "serving as an example or illustration." Any aspect or design described herein as "exemplary" is not necessarily to be construed as preferred or advantageous over other aspects or designs.

In the specification, when a region is "connected" to another region, the regions may not only be "directly connected", but may also be "electrically connected" via another device therebetween. When a part "includes" or "comprises" an element, unless there is a particular description contrary thereto, the part can further include other elements, not excluding the other elements. Also, the term "unit" in the embodiments of the present invention means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

As used herein, the term "and/or" includes any and all combinations of one or more of the associated listed items. Expressions such as "at least one of," when preceding a list of elements, modify the entire list of elements and do not modify the individual elements of the list. Thus, claim language reciting "at least one of" a set indicates that one member of the set or multiple members of the set satisfy the claim.

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail so as not to obscure the embodiments with unnecessary detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

In the specification, hardware denotes a physical component included in an electronic device. For example, the hardware may include a central processing unit (CPU) or a graphic processing unit (GPU), and may be any hardware on which power management may be performed.

Herein, operation information related to an operation recognizable to a user denotes operation information that is expressed to the user about an operation directly or indirectly experienced by the user. In other words, the operation information denotes information about an operation experienced by the user or provided to the user at an end of a processing pipeline of an electronic device. For example, the user may not know an accurate value of a number of frames per unit time of a screen output to the user, but the user may directly experience the number of frames based on smooth displaying of the screen or on a degree of breaks in the displaying of the screen or may indirectly experience the number of frames when the number of frames calculated by a GPU is expressed as a numerical value.

FIG. 1 is a diagram showing an exemplary method of managing power.

In FIG. 1, an electronic device may receive an application execution command through an interface or the like of a user device in operation 110. Here, the electronic device may be a device using a battery, such as a laptop computer, a tablet computer, a smartphone, a mobile terminal, or may be a device partially using a power socket, such as a desktop computer. Also, the application execution command may be received via a user input. The user input may be a command to execute an application selected by a user. In addition, the application execution command may be received from an external apparatus through a wired/wireless communicator, or may be generated within the electronic device when a set condition is satisfied.

Then, in operation 120, the electronic device (e.g., a processor of the electronic device) may execute at least one application according to the application execution command. Here, hardware for processing a related process may be required to execute the at least one application.

In operation 130, the hardware for processing the related process may be operated. Here, the hardware may include a central processing unit (CPU) and/or a graphic processing unit (GPU), and may be any hardware on which power management is performed. According to an embodiment, operations 120 and 130 may not occur in the stated order and may be simultaneously performed. Also, when there are a plurality of pieces of hardware for processing the related process, the plurality of pieces of hardware may operate in operation 130.

In operation 140, the electronic device may output a result of executing the application by operating the hardware. The electronic device may obtain operation information related to an operation recognizable to the user, from the result. Here, the operation information may be the number of frames per unit time (e.g., frames per second (FPS)) with respect to a graphics-related operation. Also, the operation information may be a process speed, an installation speed, or a download speed with respect to an application process operation.

When the hardware operates in operation 130, a load may be generated accordingly. The load may refer to the amount of processing jobs (e.g., executing commands, processing data, calculating numbers, etc.) that the hardware is tasked with. The load may also indicate a utilization rate of available resources.

In operation 150, the electronic device may calculate or measure the amount of load generated in the electronic device as the hardware operates. When the plurality of pieces of hardware operate in operation 130, the total amount of loads taken on by all pieces of hardware that are operating may be calculated. According to an embodiment, the load may be calculated by measuring the consumption rate of processing power of the hardware or measuring the number of tasks being executed.

In operation 160, the electronic device may perform power management based on feedback information regarding the operation information obtained in operation 130 and the load measured in operation 150. According to an embodiment, the electronic device may perform power management by changing an operating property of the hardware. For example, the electronic device may adjust a voltage and/or a frequency of the hardware. Moreover, the electronic device may obtain feedback information regarding a power management performance result and perform power management on the hardware based on the feedback information. Here, the feedback information may include a change in the operation information. The method will be described in detail with reference to FIG. 2.

Figure 2:
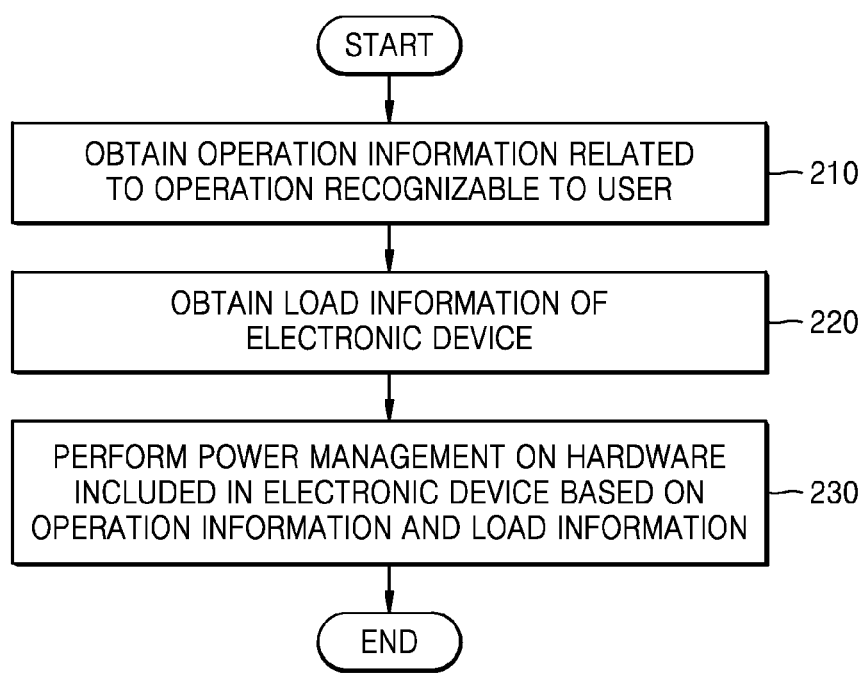
FIG. 2 is a flowchart of an exemplary method of managing power.

FIG. 2 is a flowchart of an exemplary method of managing power.

First, in operation 210, an electronic device may obtain operation information related to an operation recognizable to a user on the basis of a processing result of hardware included in the electronic device, from among operations performed by the electronic device. Here, the operation information may denote information presented to a user and directly or indirectly experienced by the user. In other words. In other words, the operation information may refer to information about an operation experienced by the user or provided to the user at the end of a processing pipeline of the electronic device.

According to an embodiment, the operation information may include the number of frames per unit time (e.g., FPS). The user may not perceive the accurate value of the number of frames per unit time of a screen output to the user, but the user may directly experience the number of frames based on smooth displaying of the screen or based on the amount of stuttering, freezing, tearing, etc. in the displaying of the screen or may indirectly experience the number of frames when the number of frames calculated by a GPU is presented on the screen as a numerical value.

Also, according to an embodiment, the operation information may include a process speed, an installation speed, and/or a download speed. The user may directly experience a process operation through a time taken by the electronic device to perform a process, installation, or download. The user may also indirectly experience the process, installation, or download speed through numerical values displayed on the screen.

Moreover, according to an embodiment, the operation information may include a user interface (UI) response time (e.g., a duration between a time when a button is pressed by the user and a time when an operation corresponding to the button is completed), sound, vibration, an image, a UI change, or feedback provided to the user. Also, according to an embodiment, the operation information may include an application completion time (e.g., collected based on the information the application provides to the UI through a loading indicator expressed in percentage, a bar, or a loading animation).

According to an embodiment, the electronic device may obtain the operation information by calculating, measuring, or detecting the operation information.

Then, in operation 220, the electronic device may obtain load information of the electronic device. The load information may be measured in a utilization rate of the electronic device with respect to available resources. For example, when there are 100 available resources and the electronic device is currently using only 30 available resources, the utilization rate is 30%. According to an embodiment, the electronic device may obtain the load information per hardware currently operating.

According to an embodiment, the load information may include information about a load type determined according to a type of an application being executed by the electronic device. For example, when an application currently being executed is a three-dimensional (3D) video game, the high number of frames per unit time may be required. However, in a general-purpose computing environment (e.g., a benchmark), the high number of frames per unit time may not be as important as it is in the 3D game. Also, a UI operation may be performed with low power consumption. Thus, the information about a load type may indicate a load requirement that may be different according to the type of application being currently executed.

Lastly, in operation 230, the electronic device may perform power management on hardware included in the electronic device based on the operation information and the load information. According to an embodiment, the electronic device may perform power management on the hardware by adjusting at least one operating property of the hardware (e.g., a voltage, a frequency of the hardware). The voltage and/or the frequency may be adjusted via dynamic voltage and frequency scaling (DVFS).

According to an embodiment, the electronic device may increase the frequency and/or voltage in response to an increase in the load, and decrease the frequency and/or voltage when the load decreases. The electronic device may also adjust the frequency and/or the voltage not only based on the load, but also based on the operation information. For example, the electronic device may adjust the frequency and/or the voltage to obtain the highest possible performance per watt. As described above, while a performance increase and frequency and/or voltage increases are linear, an increase in power is a squaring function. Accordingly, it is not easy to find the most efficient operating point based on the load alone, particularly in an electronic device where various pieces of hardware interoperate in a complex manner to support various functions, as will be described with reference to FIGS. 3 and 4.

Figure 3:
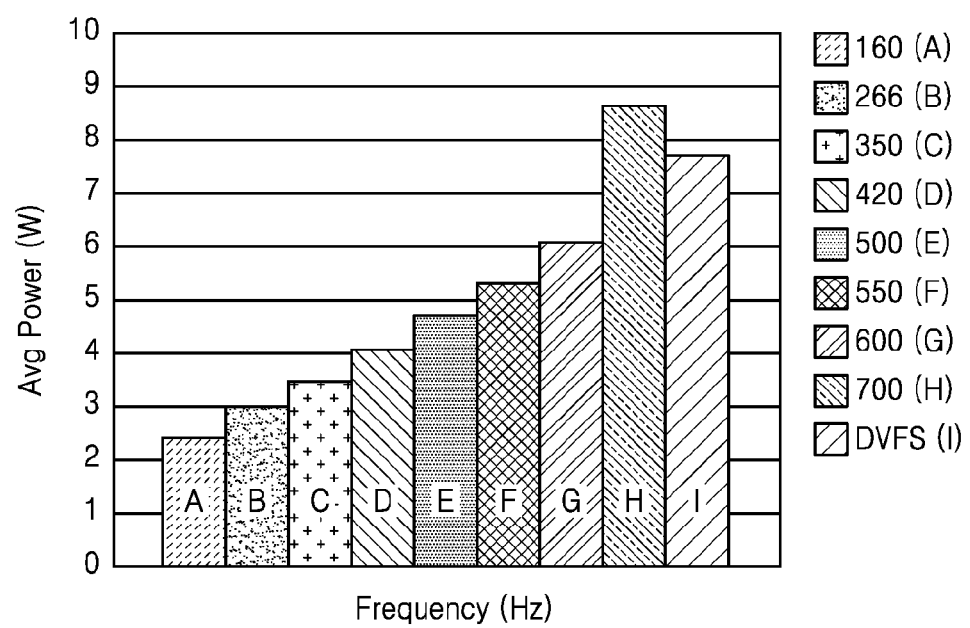
FIG. 3 is a graph showing a relationship between frequency and power consumption, according to exemplary benchmark results.
Figure 4:
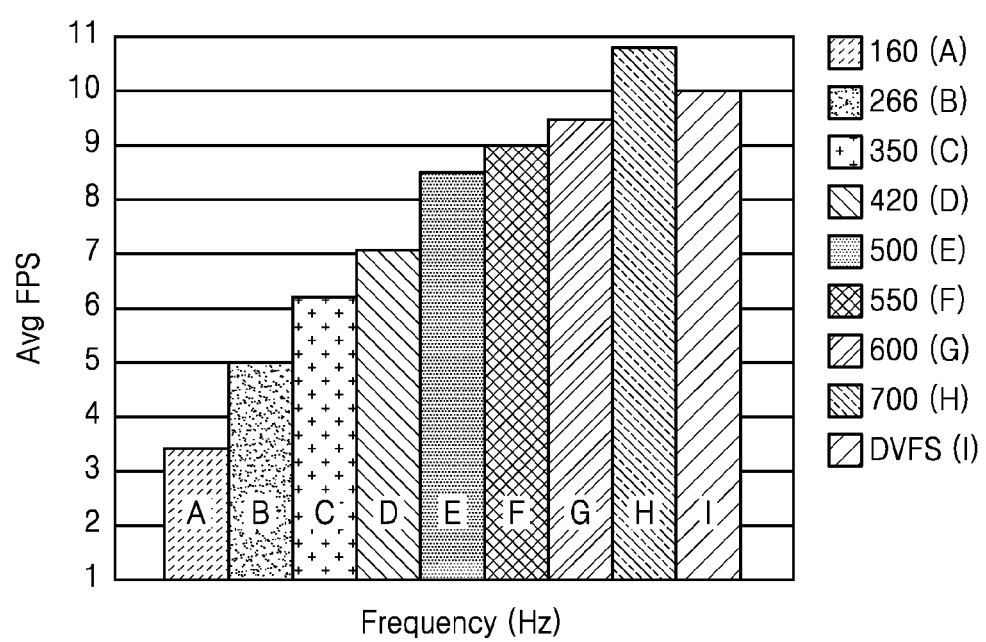
FIG. 4 is a graph showing a relationship between frequency and frames per second (FPS), according to exemplary benchmark results.

FIG. 3 is a graph showing a relationship between frequency and power consumption, according to exemplary benchmark results, and FIG. 4 is a graph showing a relationship between frequency and FPS, according to exemplary benchmark results.

In FIG. 3, the X-axis of the graph denotes frequency and the Y-axis of the graph denotes average power consumption. In FIG. 4, the X-axis of the graph denotes frequency while the Y-axis denotes FPS. As shown in FIGS. 3 and 4, in order to compare the relationship between power consumption and FPS at the same frequency, frequencies of 160 Hz (A), 266 Hz (B), 350 Hz (C), 420 Hz (D), 500 Hz (E), 550 Hz (F), 600 Hz (G), and 700 Hz (H) are used. Also, (I) denotes a case in which DVFS is performed at frequencies of 600 to 700 Hz without applying operation information related to an operation recognizable to a user. In (A) to (H) of FIG. 3, power consumption increases as the frequency increases, and in (A) to (H) of FIG. 4, FPS increases as the frequency increases.

Power consumption and FPS may be compared per frequency by referring to FIGS. 3 and 4. In this regard, power consumption per frame when DVFS is performed (i.e., (I)), and at the frequency of 600 Hz (G) and the frequency of 700 Hz (H) is respectively measured.

In (I), 7.76 watt of power is consumed at the frequencies of 600 to 700 Hz, and 10.02 frames are displayed per second. Here, 0.77 watt/FPS is obtained when power consumption is divided by the FPS to calculate power consumption per frame.

In (G), 6.11 watt of power is consumed, and 9.55 frames are displayed per second. Here, power consumption per frame is 0.63 watt/FPS.

In (H), 8.8 watt of power is consumed, and 10.91 frames are displayed per second. Here, power consumption per frame is 0.81 watt/FPS.

When the frequency increases, power consumption and FPS increase, but power consumption per frame also increases, and thus the overall power efficiency decreases. In (I), an operation point at which power consumption per frame is an average value of power consumption per frame values of (G) and (H) is selected.

Here, an operation in (G) may result in 22% in power reduction with only 4% of performance degradation compared to an operation in (I). In terms of power management, (G) is the most efficient operation point for saving power with the least performance degradation. In other words, it is more effective to perform power management based on a load and operation information related to an operation recognizable to a user, such as FPS, rather than performing power management solely based on the load.

In addition, when power management is performed only based on a load, it may be highly likely that an electronic device may continually increase the frequency of hardware when the load is high. In this case, the hardware may reach an operation limit (e.g., a temperature limit) as time goes by, and when the hardware reaches the operation limit, a frequency may be also limited and the FPS may rapidly decline, and thus a user may sense the deterioration in performance. Accordingly, rather than performing power management only based on a load, more efficient power management may be achieved by taking into account the load and operation information related to an operation recognizable to a user.

Moreover, even though FIGS. 3 and 4 show power consumption and FPS based on frequencies, it would be obvious to one of ordinary skill in the art that power consumption and FPS may be shown on graphs based on voltages.

Referring back to FIG. 2, according to an embodiment, the electronic device may lower the frequency and the voltage when the electronic device is close to an operation limit or is about to reach the operation limit in the near future.

Also, according to an embodiment, the electronic device may perform power management by selecting one of different pieces of hardware while enabling/disabling certain hardware components.

Also, the electronic device may compare at least one input and at least one preset value, and perform power management based on a result of the comparison. Here, the preset value may be calculated or obtained by one of ordinary skill in the art via experiments. Also, according to an embodiment, such a method of managing power may include a deterministic algorithm or may include a machine learning process.

Also, according to an embodiment, when the load information includes information about a load type, power management may be performed according to the load type. When a high performance level is required, power management may be performed focusing more on performance than power consumption. At other times, power management may be performed by prioritizing power consumption over performance.

For example, when power management is performed based on FPS, the method may differ depending on whether the application is a game or a benchmark. A game may be rendered at 60 FPS when the frequency increases, and thus a FPS threshold value may be set relatively higher, whereas a benchmark may not normally reach 60 FPS, and thus the FPS threshold value may be set relatively lower. In addition, because a normal UI operation may not significantly increase the temperature of a computer device, power and temperature conditions may be ignored for general UI operations.

According to an embodiment, while performing power management, the electronic device may additionally consider other parameters, in addition to the load information and the operation information. For example, the electronic device may consider power consumption, a processor load, a processor frequency, a bus load, a bus frequency, a storage device (e.g., input and output activities of a disk), and a temperature of the hardware. Such parameters may be obtained from a kernel, a sensor, etc. of the electronic device.

As described above, when power consumption is performed through DVFS based only on a load without considering the operation information of the electronic device, power management may not be efficiently performed.

According to an embodiment, power management may be efficiently performed based on the operation information, such as FPS. Also, according to an embodiment, power management may be performed without being affected by a relationship between the plurality of pieces of hardware by performing the power management based on the operation information instead of on an operation state of the hardware.

Figure 5:
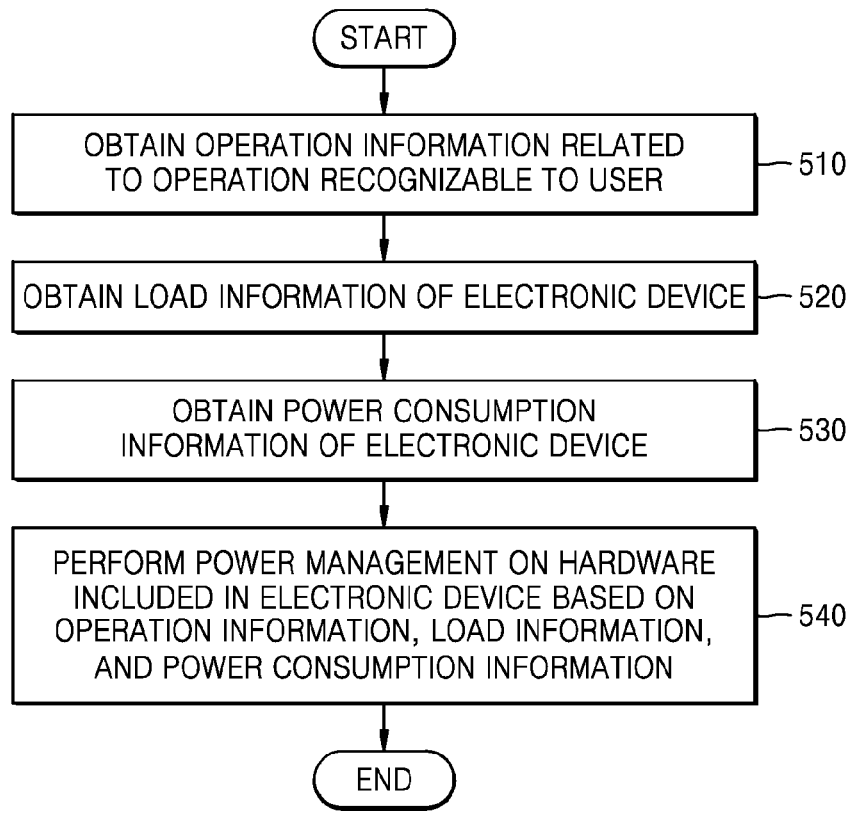
FIG. 5 is a flowchart of another exemplary method of managing power.

FIG. 5 is a flowchart of another exemplary method of managing power.

Since operations 510 and 520 of FIG. 5 are substantially similar to operations 210 and 220 of FIG. 2, details thereof are not provided here.

In operation 510, an electronic device may obtain operation information related to an operation recognizable to a user through a process result of hardware included in the electronic device, from among operations performed by the electronic device, and in operation 520, load information of the electronic device may be obtained.

In operation 530, the electronic device may obtain power consumption information of the electronic device. The electronic device may obtain the power consumption information by measuring power consumption or by estimating power consumption. According to an embodiment, the power consumption information may be obtained by using a means of neural networks or other techniques including techniques based on machine learning. Here, the neural networks may be trained by automatically adjusting weights of the connections between neurons in order to achieve a desired output for a given input.

In operation 540, the electronic device may perform power management on the hardware included in the electronic device based on the operation information, the load information, and the power consumption information. The power management may be performed in the same manner as in operation 230 of FIG. 2, and thus details thereof are not provided again.

According to an embodiment, the electronic device may perform power management such that power consumption is reduced.

In addition, in operation 540, the electronic device may perform power management by using Formula 1 below.

For every step [Formula 1]

$$\begin{cases} \text{Decrease Freq,} \\ \quad \text{accum} = 0, & f(P, T, F, G_{Load}) + \text{accum} \le -1 \\ \text{accum} += \\ \quad f(P, T, F, G_{Load}), & \text{else} \\ \text{Increase Freq,} \\ \quad \text{accum} = 0, & f(P, T, F, G_{Load}) + \text{accum} \ge 1 \end{cases},$$

where $f(P, T, F, G_{Load}) =$ $$-w_P \frac{\max(P-1, 0)}{2} - w_T \frac{\max(T-55, 0)^{1.1}}{20} + w_F \frac{(60-F)}{30} + 2 \times (G_{Load} - 0.9)$$

Here, P represents power, T represents a temperature in Celsius, F represents FPS, $G_{Load}$ represents a load, and w represents a weight parameter configurable according to importance. In other words, $w_P$ represents a weight assigned to power, $w_T$ represents a weight assigned to temperature, and $w_F$ represents a weight parameter assigned to frequency. The function max(a,b) represents the maximum value between a and b.

When a result value of $f(P,T,F,G_{Load})$ is greater than or equal to 1, the electronic device may output a signal for increasing a frequency of the hardware, and the value of the accumulator (i.e., accum) is reset to 0. However, when the result value of $f(P,T,F,G_{Load})$ is less than or equal to −1, the electronic device may output a signal for decreasing the frequency, and the value of accum is reset to 0. Otherwise, when the result value of $f(P,T,F,G_{Load})$ is greater than −1 and less than 1, then accum is adjusted according to the result value of $f(P,T,F,G_{Load})$. Here, the weight parameter may be adjusted by the user. The various constant values used in the formula (i.e., 55, 1.1, 0.9, etc.) may also be adjusted by experimentation.

Figure 6:
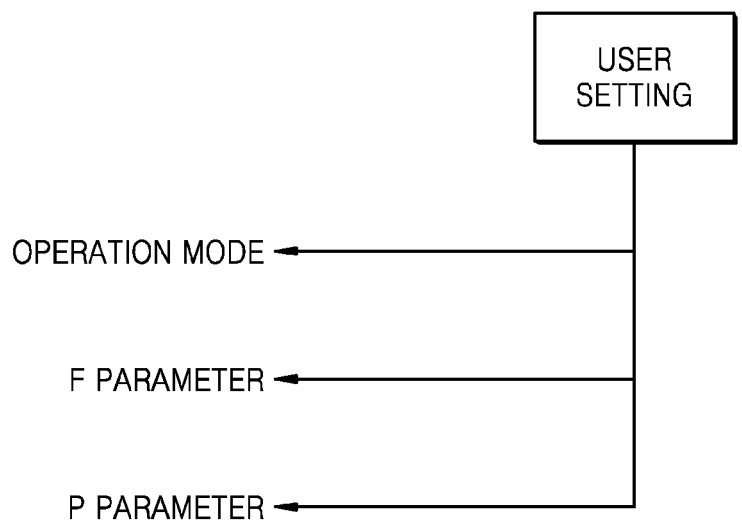
FIG. 6 is a block diagram of exemplary user settings.

FIG. 6 is a block diagram of exemplary user settings.

In FIG. 6, an electronic device may set an operation mode of the electronic device, an F parameter related to the number of frames per unit time, and a P parameter related to power consumption according to an input signal obtained from a user through an input unit (e.g., a UI unit). FIG. 6 will be described together with FIG. 7.

Figure 7:
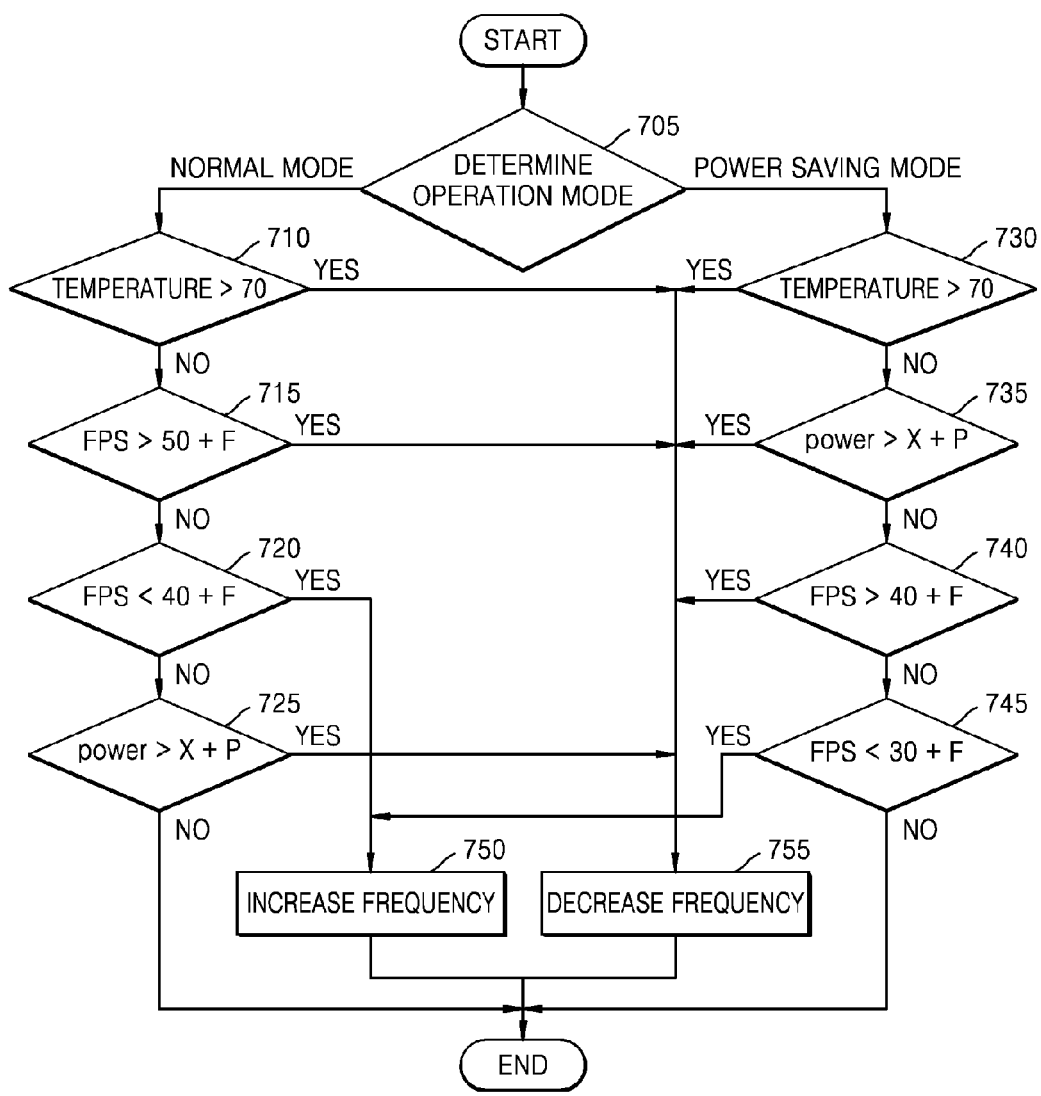
FIG. 7 is a flowchart showing a process of an exemplary device operating under a normal mode and a power saving mode.

FIG. 7 is a flowchart showing a process of an exemplary device operating under a normal mode and a power saving mode.

First, in operation 705, an electronic device may determine an operation mode of the electronic device. The operation mode may be determined according to an operation mode set by a user as described in FIG. 6. In FIG. 7, examples of the operation mode may include a normal mode and a power saving mode, but are not limited thereto, and various operation modes may be set.

In operation 705, when the electronic device determines the operation mode to be a normal mode, the electronic device may determine whether an input indicating a temperature exceeds a certain threshold value (e.g., 70° C.), in operation 710. When it is determined that the temperature exceeds the threshold value, the electronic device may adjust a frequency of hardware related to an operation to decrease, in operation 755. The electronic device may decrease the frequency such that an operation limit is not reached.

When it is determined that the temperature is below the threshold value in operation 710, it is determined whether the number of frames per unit time (e.g., FPS) is greater than the sum of a first FPS threshold value (e.g., 50) and the F parameter in operation 715. According to an embodiment, the F parameter may have a value set by the user as shown in FIG. 6. When it is determined that the FPS is greater than the sum of the first FPS threshold value and the F parameter, the electronic device may adjust the frequency of the hardware to decrease in operation 755.

However, when it is determined that the FPS is less than or equal to the sum of the first FPS threshold value and the F parameter in operation 715, the electronic device may determine whether the FPS is less than a sum of a second FPS threshold value (e.g., 40) and the F parameter in operation 720. When it is determined that the FPS is less than the sum of the second FPS threshold value and the F parameter, the electronic device may cause the frequency of the hardware to increase in operation 750. In operations 710 and 715, a suitable frequency may be searched for based on operation information related to an operation of the electronic device recognizable to a user.

When it is determined that the FPS is greater than or equal to the sum of the second FPS threshold value and the F parameter in operation 720, the electronic device may determine whether power consumption is greater than a sum of the P parameter and a value X in operation 725, where X denotes a predetermined value. According to an embodiment, X may be designed in terms of hardware and thus may not allow the user to set the value, while the P parameter may have a value set by the user as shown in FIG. 6.

When it is determined that the power consumption is greater than the sum of X and the P parameter in operation 725, the electronic device may lower the frequency of the hardware in operation 755. Also, when it is determined that the power consumption is less than or equal to the sum of X and the P parameter, the operation process may come to an end. According to an embodiment, when the operation process is ended, the frequency is not changed and is maintained.

In operation 705, when the electronic device determines the operation mode to be the power saving mode, the electronic device may then determine whether an input indicating a temperature exceeds a certain threshold value (e.g., 70° C.), in operation 730. When it is determined that the temperature exceeds the threshold temperature value, the electronic device may lower the frequency of the hardware in operation 755. When the frequency is decreased, the electronic device may make sure that an operation limit is not reached.

In the power saving mode, determination related to power may be first performed in consideration of power before operation performance, and then determination related to FPS may be performed.

When it is determined that the temperature is less than or equal to the threshold temperature value in operation 730, the electronic device may determine whether power consumption is greater than a sum of X, which is a pre-set value, and the P parameter in operation 735. According to an embodiment, X may be designed in terms of hardware and thus may not allow the user to set the value, while the P parameter may have a value set by the user as shown in FIG. 6. When it is determined that the power consumption is greater than the sum of X and the P parameter in operation 735, the electronic device may lower the frequency of the hardware in operation 755.

When it is determined that the power consumption is less than the sum of X and the P parameter in operation 735, then the electronic device may determine whether the number of frames per unit time (e.g., FPS), is greater than a sum of a third FPS threshold value (e.g., 40) and the F parameter in operation 740. When it is determined that FPS is greater than the sum of the third FPS threshold value and the F parameter, the electronic device may lower the frequency of the hardware in operation 755.

Also, when it is determined that FPS is less than or equal to the sum of the third FPS threshold value and the F parameter in operation 740, the electronic device may determine whether FPS is less than a sum of a fourth FPS threshold value (e.g., 30) and the F parameter in operation 745. When it is determined that FPS is less than the sum of the fourth FPS threshold value and the F parameter, the electronic device may raise the frequency of the hardware in operation 750, and when it is determined that FPS is greater than or equal to the sum of the fourth FPS threshold value and the F parameter, the operation process may be terminated. According to an embodiment, when the operation process is ended, the frequency is not changed and is maintained.

In the power saving mode, determination related to power may be first performed in consideration of power before operation performance, and then determination related to FPS may be performed.

In FIG. 7, the electronic device may adjust the frequency to a set level or adjust by a certain value. In other words, in operations 750 and 755, the electronic device may raise or lower the frequency by a set value (e.g., raise the frequency by 60 Hz) or to be a set value (e.g., set the frequency to 550 Hz).

According to an embodiment, the order in which determinations are performed may vary, at least two determinations may be performed concurrently, and at least one determination may be omitted. For example, operations 715 and 720 may be performed first and then operation 710 may be performed. Also, operations 715 and 725 may be performed concurrently, and operation 720 may be omitted.

According to an embodiment, each determination may include an if-else condition set. Also, the user may adjust a hardcoded function by changing an operation mode or values of some parameters.

Figure 8:
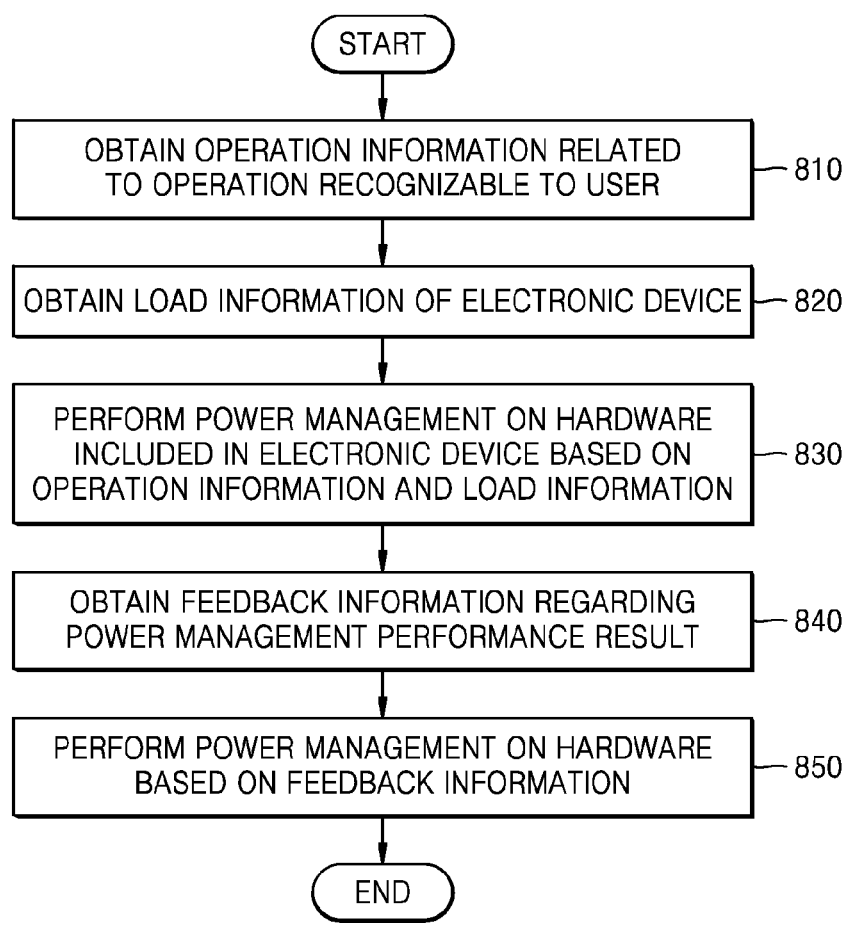
FIG. 8 is a flowchart of an exemplary method of managing power.

FIG. 8 is a flowchart of an exemplary method of managing power.

Because operations 810 through 830 of FIG. 8 are substantially similar to operations 210 through 230 of FIG. 2, details thereof are not provided again.

In operation 810, an electronic device may obtain operation information related to an operation recognizable to a user through a process result of hardware included in the electronic device, from among operations performed by the electronic device, and in operation 820, the electronic device may obtain load information of the electronic device. In addition, in operation 830, the electronic device may perform power management on the hardware based on the operation information and the load information.

In operation 840, the electronic device may obtain feedback information regarding a power management performance result. According to an embodiment, the feedback information may include a change in the operation information.

Then, in operation 850, the electronic device may perform power management on the hardware based on the feedback information. According to an embodiment, the electronic device may receive the feedback information and assign a positive reward or a negative reward to a power management operation performed immediately before based on content of the feedback information. According to an embodiment, the positive reward may be assigned for approaching goals and the negative reward may be assigned for departing from the goals. According to an embodiment, power management operations to which a reward is assigned may be preferentially selected (a positive reward) or may be excluded (a negative reward) during the following power management operation determinations. In other words, the electronic device may learn and improve upon the method of managing power based on the feedback information.

According to an embodiment, such learning may be performed by machine learning, and in particular, based on a Q-learning approach, which is a type of reinforcement learning. The reinforcement learning may be conducted by performing calculations according to Formula 2 as shown below.

$$y = f(x)/[\text{Env},R] \qquad \text{[Formula 2]}$$

In Formula 2, x represents a current state of the electronic device and y represents an operation determined by a process. Given heuristic examples of x and y, the process should find f( ) with the user of an environment (Env) and rewards (R). According to an embodiment, the current state of the electronic device may include, for example, FPS, a GPU frequency, a GPU load, a temperature, a battery level, and/or power. Also, the operation determined by the process may include an increasing frequency, decreasing frequency, or maintaining current frequency. Alternatively, the process may determine a range/set of frequencies. Examples of convergence points/goals that may be targeted by the process include a certain temperature point, a highest possible FPS and/or a high GPU load. As described above, a reward used by the process may include a positive reward for approaching the goals and a negative reward for deviating from the goals.

For example, a reinforcement learning heuristic model for controlling GPU power management may be as follows:

Operation 1: Read current state ($S_t$)
Operation 2: Select operation based on current state ($S_t$)
Operation 3: Determine reward for current state ($S_t$)
Operation 4: Update most recent operation ($S_{t-1}$, $A_{t-1}$)
Operation 5: Perform operation 1

Figure 9:
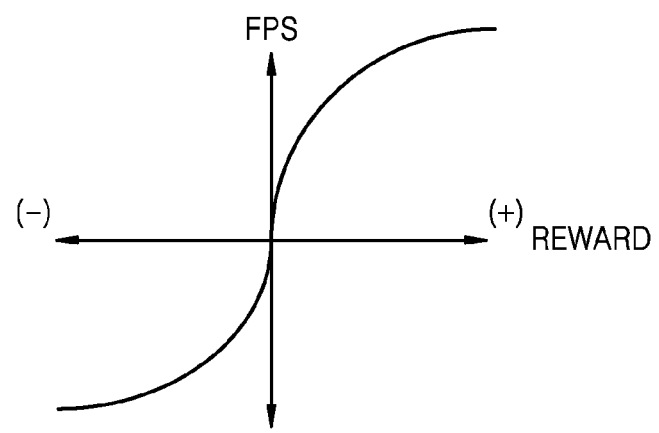
FIG. 9 is a graph for determining a reward, according to an exemplary embodiment.
Figure 10:
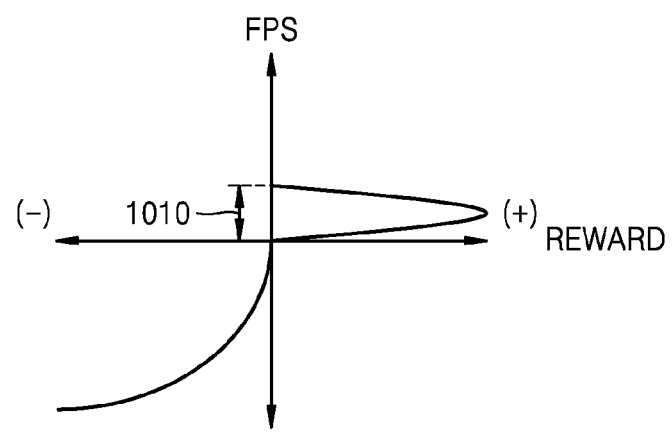
FIG. 10 is a graph for determining a reward, according to another exemplary embodiment.

When there are a plurality of goals, such as power, a temperature, and FPS, a reward may be selected according to graphs as shown in FIGS. 9 and 10.

FIG. 9 is a graph for determining a reward, according to an exemplary embodiment, and FIG. 10 is a graph for determining a reward, according to another exemplary embodiment.

In FIGS. 9 and 10, the x-axis denotes a degree of reward and the y-axis denotes an amount of FPS. FIG. 9 shows a general case, in which a positive reward is assigned when high performance is observed (i.e., when FPS per unit time is high), and a negative reward is assigned when low performance is observed (i.e., when FPS per unit time is low). In comparison, in FIG. 10, a high reward is assigned at a certain section of the entire FPS range. In particular, a high reward is assigned to a FPS range 1010.

In addition, the electronic device may calculate a reward according to Formula 3 below.

$$P_{Reward}(p) = -p \quad \text{[Formula 3]}$$

$$T_{Reward}(t) = \begin{cases} 0, & t < 65 \\ -\left(\frac{(t_n - 65)^2 * (t_n - t_{n-1})}{10}\right), & t \geq 65 \end{cases}$$

$$FPS_{Reward}(f) = \frac{(f_n - 50)}{30} + \begin{cases} 0.3, & (f_n - f_{n-1}) < -1 \\ 0, & \text{else} \\ -0.3, & (f_n - f_{n-1}) > 1 \end{cases}$$

$$GPU_{LOAD_{Reward}}(l) = \sin\left(l * \frac{\pi}{2}\right) - 0.9$$

$$R(p, t, f, l) = P_R(p) + T_R(t) + FPS_R(f) + GPU_{LOAD_R}(l)$$

Here, p represents power, t represents time, f represents a frequency, T represents a temperature, n represents a current reward value, n−1 represents a previous reward value, L represents a load value of GPU, and R represents a next reward value.

According to an embodiment, a method of managing power to be operated at optimum FPS/watt may be provided. The term "optimum" as used herein does not necessarily connote an absolute best result possible, but the term may merely indicate an improvement over other results or what could be achieved via conventional methods. According to an embodiment, an optimum value may be derived from experiment data, and because power is scaled to a square of a frequency, the optimum value may be a lowest possible frequency. According to an embodiment, the method in which hardware operates at a "better" or "close-to-optimal" FPS/watt for a predetermined "good enough" FPS value, instead of using too much power, may be provided.

The method of managing power, according to an embodiment, has been described above. Hereinbelow, an electronic device, according to an embodiment, will be described. The method according to an embodiment may be performed by the electronic device described below, and the electronic device according to an embodiment may perform power management according to the method described above.

Figure 11:
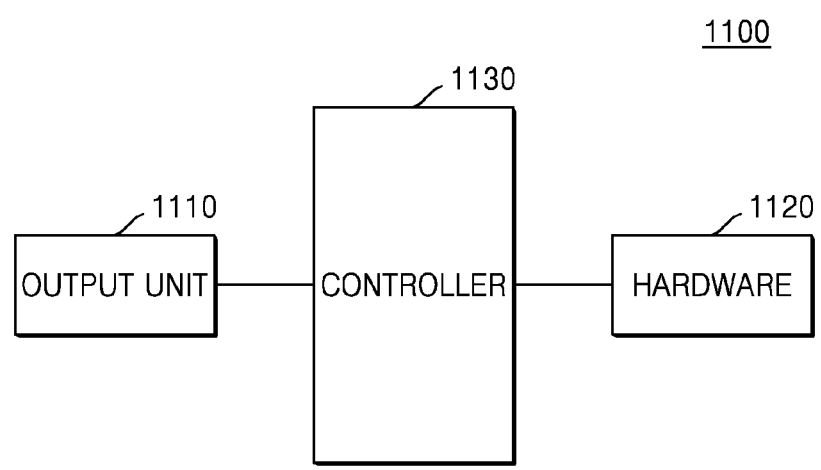
FIG. 11 is a block diagram of an internal structure of an exemplary electronic device.

FIG. 11 is a block diagram of an internal structure of an exemplary electronic device 1100.

As shown in FIG. 11, the electronic device 1100 may include an output unit 1110, additional hardware 1120, and a controller 1130.

The output unit 1110 may output or present a process result of hardware to a user. According to an embodiment, the output unit 1110 may include a display. In addition, the output unit 1110 may include any device for outputting the process result to the user, such as a light-emitting diode (LED) indicating lamp or a speaker.

The hardware 1120 may execute a process. According to an embodiment, the hardware 1120 may include a physical component included in the electronic device 1100. For example, the hardware 1120 may include a CPU and/or a GPU, and any other hardware components on which power management may be performed.

The controller 1130 may perform power management by controlling the overall operations of the electronic device 1100. According to an embodiment, the controller 1130 may include a random access memory (RAM) that stores a signal or a data input from an external source or is used as a storage space corresponding to various operations performed by the electronic device 1100. The controller 1130 may also include a read-only memory (ROM) that stores a control program for controlling peripheral devices. The controller 1130 may also include a processor. The processor may be embodied as a system-on-chip (SoC) in which a core and a GPU may be integrated. Also, the processor may include a plurality of processors or processor cores. Also, when the controller 1130 is a target of power management, the controller 1130 and the hardware 1120 may be one component.

According to an embodiment, the controller 1130 may obtain operation information of the electronic device 1100 related to an operation recognizable to the user through a process result of the hardware 1120, from among operations performed by the electronic device 1100. The process result may be output through the output unit 1110 The controller 1130 may also obtain load information related to a load generated by an operation performed by the electronic device 1100, and perform power management on the hardware 1120 based on the operation information and the load information. Here, the operation information may be presented to the user and directly or indirectly experienced by the user. In other words, the operation information denotes information about an operation experienced by the user or provided to the user at an end of a processing pipeline (e.g., display, speaker, printer, etc.) of the electronic device 1100.

According to an embodiment, the controller 1130 may modify an operating property of the hardware 1120. Also, the controller 1130 may adjust a voltage and/or a frequency of the hardware 1120.

Also, according to an embodiment, the controller 1130 may obtain power consumption information of the electronic device 1100, and perform power management on the hardware 1120 based on the power consumption information, as will be described with reference to FIGS. 12 and 13.

Figure 12:
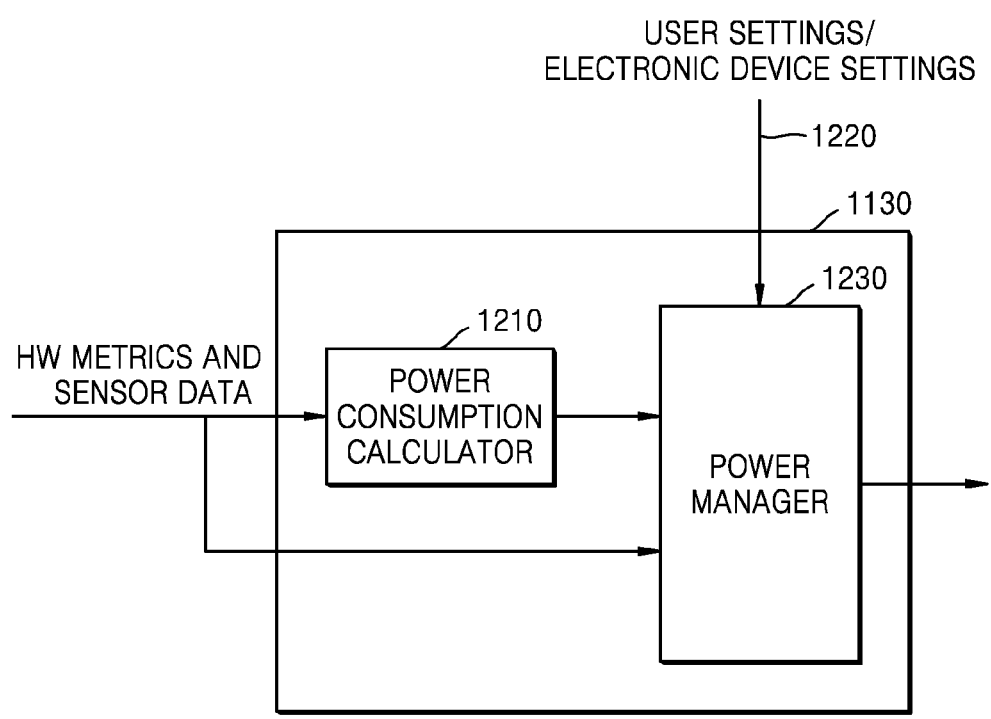
FIG. 12 is a block diagram of a controller of an exemplary electronic device.

FIG. 12 is a block diagram of the controller 1130 of the electronic device 1100.

As shown in FIG. 12, the controller 1130 according to an embodiment may include a power consumption calculator 1210 and a power manager 1230. The power consumption calculator 1210 according to an embodiment may calculate power consumption by receiving hardware metrics and sensor data. According to an embodiment, the power manager 1230 may perform power management based on the power consumption received from the power consumption calculator 1210, and the hardware metrics and the sensor data. Also, according to an embodiment, the power manager 1230 may perform power management according to user settings or electronic device settings 1220.

Figure 13:
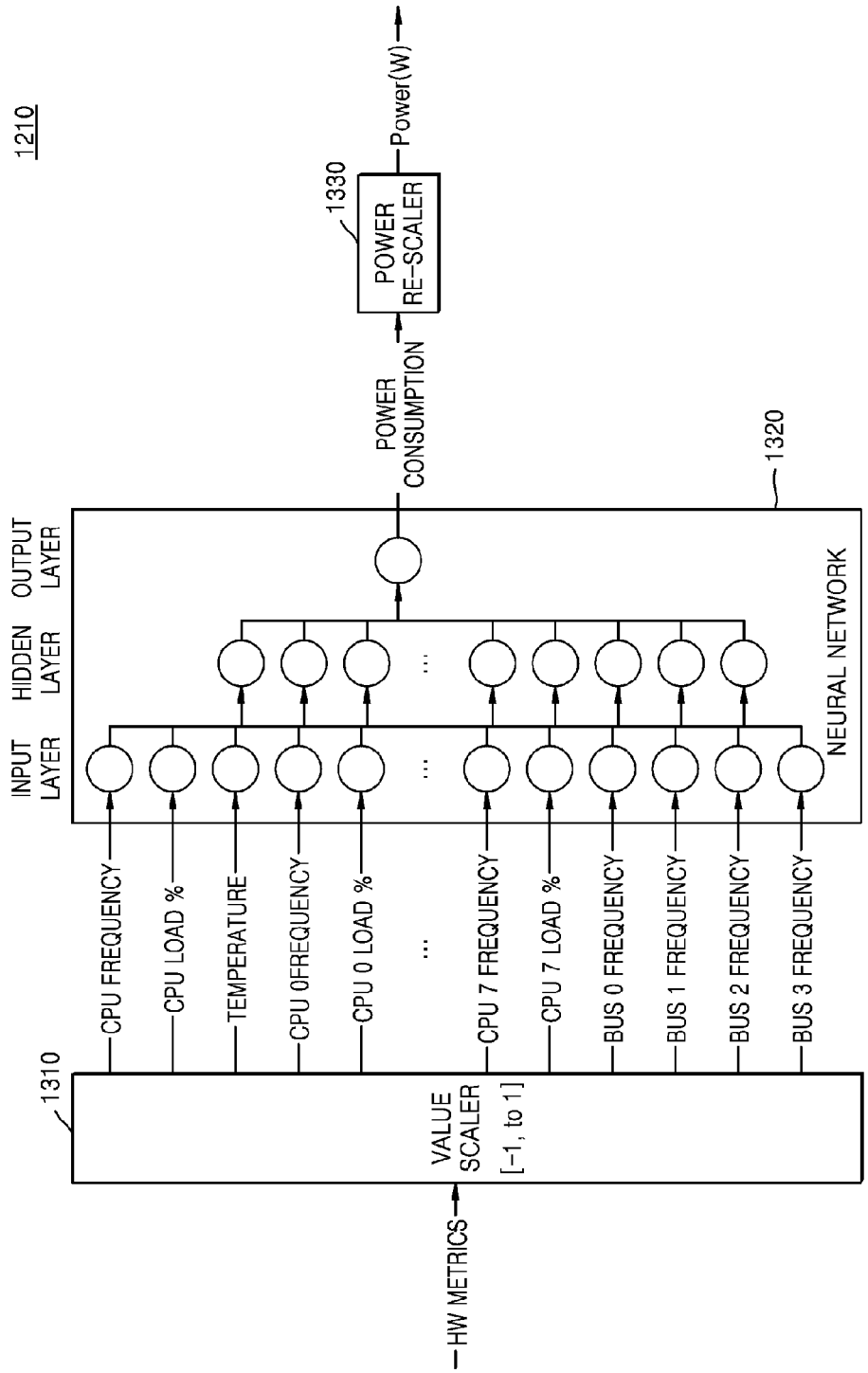
FIG. 13 is a diagram showing an internal structure of a power consumption calculator included in an exemplary electronic device.

FIG. 13 is a diagram showing an internal structure of the power consumption calculator 1210 included in the electronic device 1100.

In FIG. 13, the power consumption calculator 1210 may include a value scaler 1310, a neural network 1320, and a power re-scaler 1330.

The value scaler 1310 may receive hardware metrics. According to an embodiment, the hardware metrics may include a GPU frequency, a GPU load, a GPU temperature, and/or frequencies and loads of a set of CPUs (CPU 0 through 7). According to an embodiment, the value scaler 1310 may scale the hardware metrics to a [−1,1] range. The scaled values may be input to the neural network 1320 that processes the scaled values in a known manner and outputs result values. Each scaled value input to the neural network 1320 may be used to calculate power consumption of the electronic device 1100 through an input layer, a hidden layer, and an output layer of the neural network 1320. The power consumption calculated by the neural network 1320 may be scaled back to a real value indicated by wattage by the power re-scaler 1330. The re-scaled power consumption value may be transmitted to the power manager 1230 to be used for power management.

Referring back to FIG. 11, according to an embodiment, the load information may include information about a load type determined according to a type of an application being executed by the electronic device 1100. For example, when the application being executed is a 3D game, a high number of frames per unit time may be required. However, for more general use (e.g., a benchmark), a high number of frames per unit time may not be as important as it would be in the 3D game. Also, simple UI operations may be performed with only low power consumption. As such, the information about a load type (i.e., type of application currently executed) may be indicative of the expected performance requirements, as will be described with reference to FIGS. 14 and 15.

Figure 14:
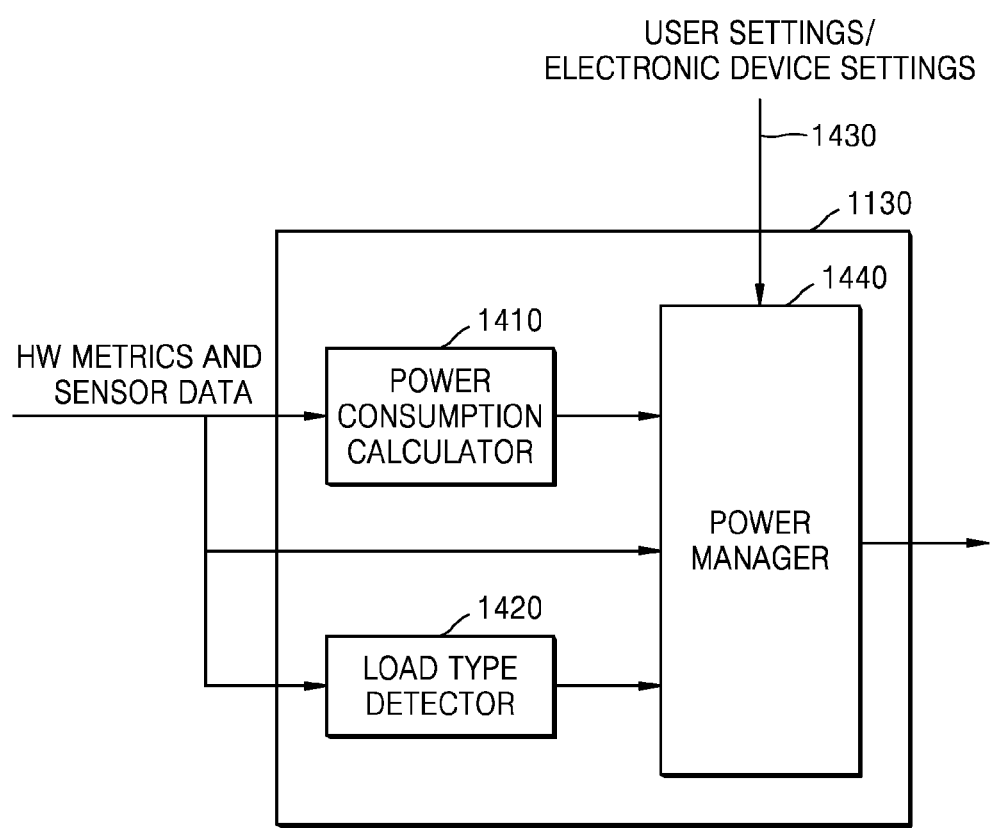
FIG. 14 is a block diagram of a controller of an exemplary electronic device.

FIG. 14 is a block diagram of the controller 1130 of the electronic device 1100, according to another embodiment.

As shown in FIG. 14, the controller 1130 according to an embodiment may include a power consumption calculator 1410, a load type detector 1420, and a power manager 1440. The power consumption calculator 1410 may calculate power consumption by receiving hardware metrics and sensor data. The load type detector 1420 may detect a type of a task (i.e., an application) performed by the electronic device 1100. The power manager 1440 may perform power management based on the power consumption value received from the power consumption calculator 1410, the load type, the hardware metrics, and the sensor data received from the load type detector 1420. According to an embodiment, the power manager 1440 may perform power management according to user settings or electronic device settings 1430.

Figure 15:
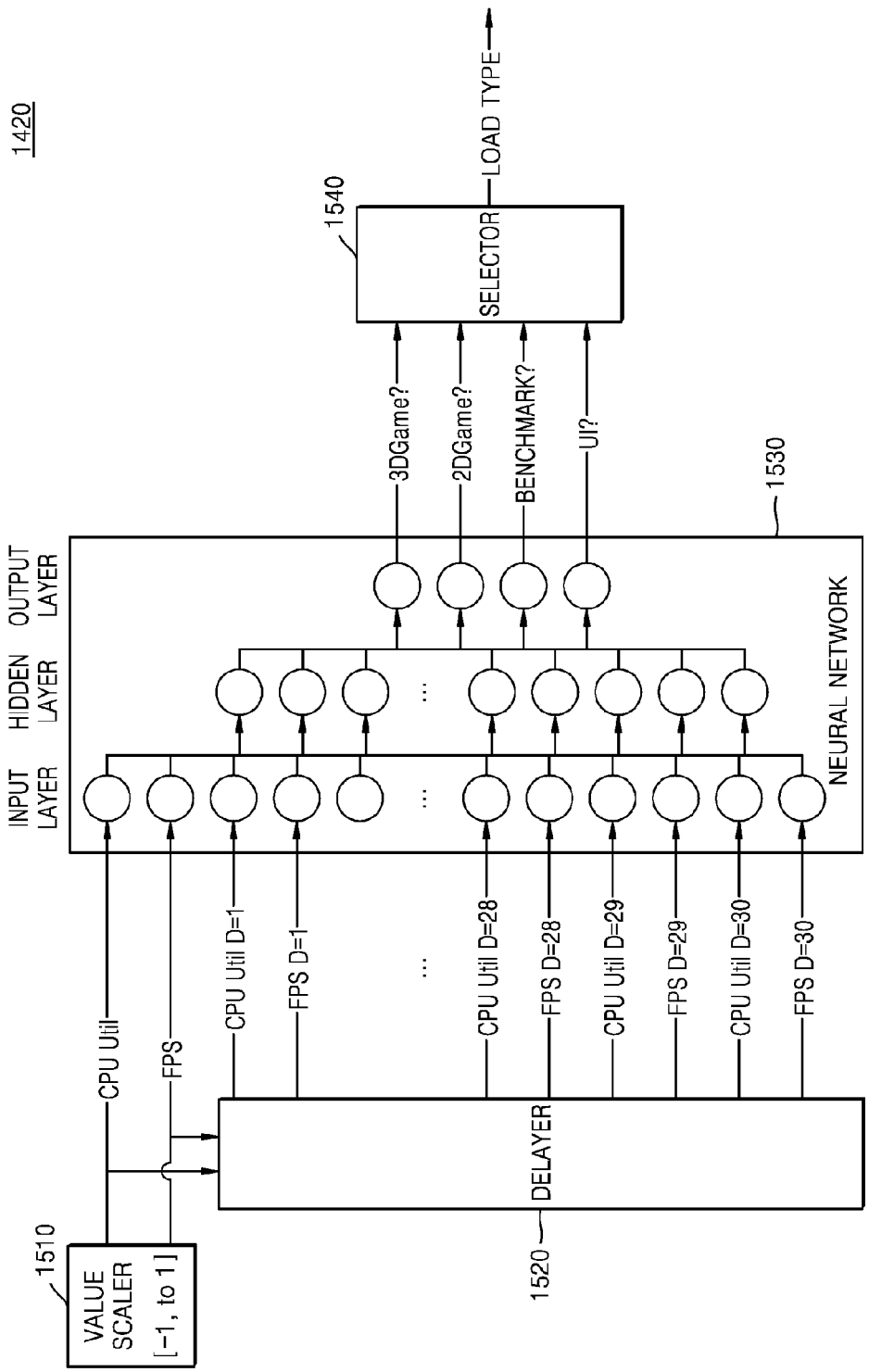
FIG. 15 is a diagram of an internal structure of a load type detector of an exemplary electronic device.

FIG. 15 is a diagram of an internal structure of the load type detector 1420 of the electronic device 1100, according to an embodiment.

As shown in FIG. 15, the load type detector 1420 may include a value scaler 1510, a delayer 1520, a neural network 1530, and a selector 1540. According to an embodiment, the load type detector 1420 may receive FPS and GPU Util (i.e., utilization) as inputs, where, Util=frequency× load %). However, the inputs illustrated in FIG. 15 are merely examples, and the load type detector 1420 may receive any other types of inputs. According to an embodiment, the value scaler 1510 may scale the FPS and the GPU Util to a [−1,1] range. The scaled values may then be input to the neural network 1530 and the delayer 1520.

The delayer 1520 may store past values of the FPS and the GPU Util, and transmit the stored past values to the neural network 1530. According to an embodiment, the delayer 1520 may include a moving window of values. In other words, the delayer 1520 may store the latest n number of FPS and GPU Util values, wherein n is a predetermined natural number.

The neural network 1530 may transmit a process result to the selector 1540 by passing the received values sequentially through an input layer, a hidden layer, and an output layer.

The selector 1540 may determine a load type based on the process result received from the neural network 1530. In FIG. 15, the load type detector 1420 may classify a load type into one of a preset number of categories (e.g., four categories including 3D games, 2D games, benchmark operations, and UI operations). The selector 1540 may select one of the preset load category types based on the process result received from the neural network 1530. The load type selected by the selector 1540 may be transmitted to the power manager 1440 for power management.

Referring back to FIG. 11, the controller 1130 according to an embodiment may obtain feedback information about a power management performance result, and perform power management on the hardware 1120 based on the feedback information. Here, the feedback information may include a change in the operation information.

Figure 16:
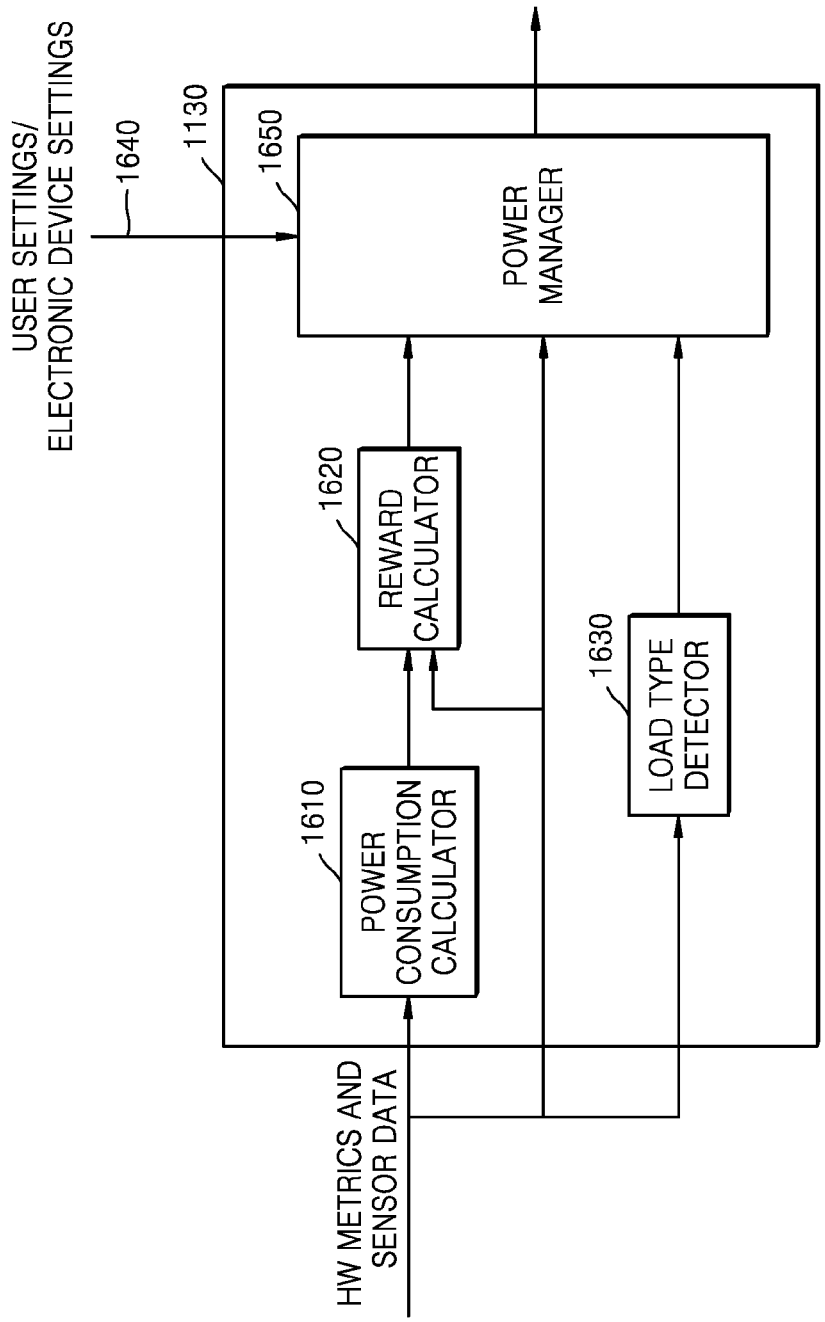
FIG. 16 is a block diagram of a controller of an exemplary electronic device.

FIG. 16 is a block diagram of the controller 1130 of the electronic device 1100, according to another embodiment.

In FIG. 16, because a power consumption calculator 1610, a load type detector 1630, and user settings or device settings 1640 of FIG. 16 are substantially similar to the power consumption calculator 1410, the load type detector 1420, and the user settings or electronic device settings 1430 of FIG. 14, details thereof are not provided again.

A reward calculator 1620 may assign a positive reward or a negative reward to the power management operation performed immediately before by using power consumption, hardware metrics, and sensor data received from the power consumption calculator 1610. The positive reward may be assigned when the progress is being made toward the goals and the negative reward may be assigned when the power management operation is moving away from the goals.

A power manager 1650 may perform power management based on the reward value received from the reward calculator 1620, and the load type, the hardware metrics, and the sensor data received from the load type detector 1630. According to an embodiment, the power manager 1650 may preferentially select (i.e., a positive reward) power management operations to which a reward is assigned or may exclude (i.e., a negative reward) the power management operations to which a reward is assigned during the following power management operation determination. In other words, the power manager 1650 may learn and improve upon the method of managing power based on the feedback information.

Figure 17:
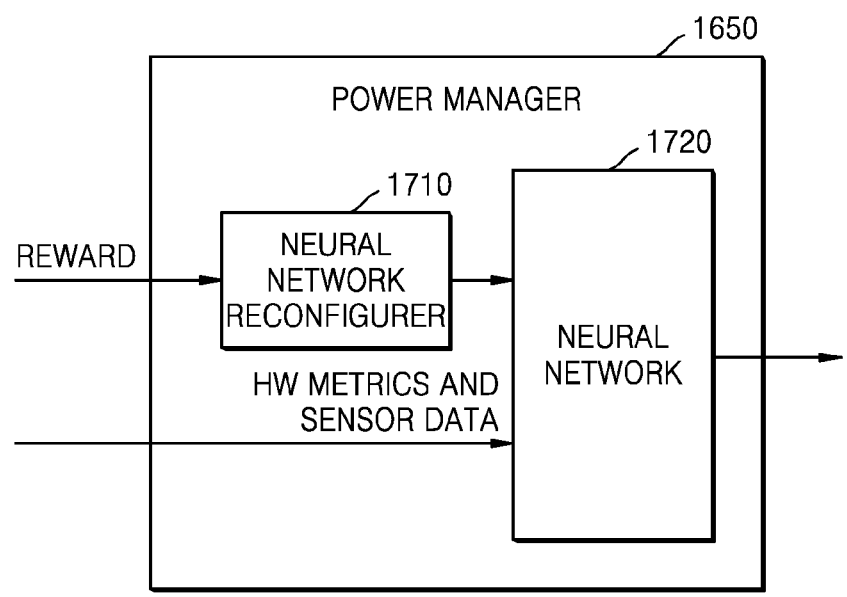
FIG. 17 is a block diagram of an exemplary power manager.

FIG. 17 is a block diagram of the power manager 1650 according to an embodiment.

As shown in FIG. 17, the power manager 1650 according to an embodiment may include a neural network reconfigurer 1710 and a neural network 1720. The neural network reconfigurer 1710 may receive a reward from the reward calculator 1620, and reconfigure the neural network 1720 according to the reward. In particular, the neural network 1720 may be positively or negatively reconfigured based on a positive reward or a negative reward, respectively. Also, the neural network 1720 may be reconfigured according to a degree of the reward.

The neural network 1720, once reconfigured, may perform power management. According to an embodiment, the neural network 1720 may include a Q-learning neural network.

Figure 18:
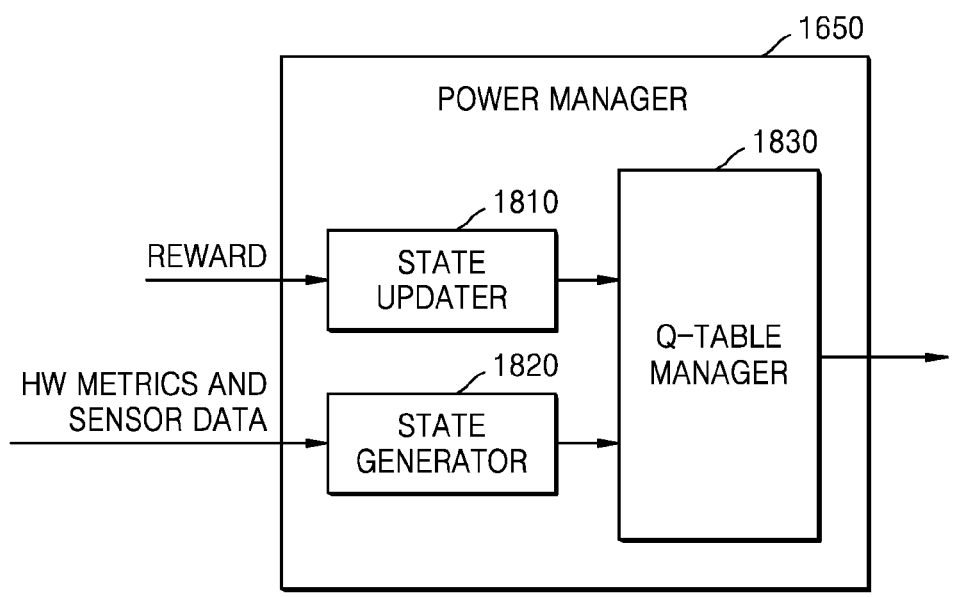
FIG. 18 is a block diagram of another exemplary power manager.

FIG. 18 is a block diagram of the power manager 1650 according to another embodiment.

As shown in FIG. 18, the power manager 1650 according to an embodiment may include a state updater 1810, a state generator 1820, and a Q-table manager 1830. The power manager 1650 according to an embodiment may perform power management based on Q-learning using a Q-table.

Table 1 below is an example of a Q-table.

TABLE 1

| States | Action |
|---|---|
| $FPS_1$, $Load_1$, . . . | $Action_1$ 1, $Action_1$ 2, $Action_1$ 3, . . . |
| $FPS_2$, $Load_2$, . . . | $Action_2$ 1, $Action_2$ 2, $Action_2$ 3, . . . |
| $FPS_3$, $Load_3$, . . . | $Action_3$ 1, $Action_3$ 2, $Action_3$ 3, . . . |

As illustrated in Table 1, the Q-table may define actions per FPS and load. The Q-table may be updated by the state updater 1810.

The state updater 1810 may update the Q-table based on a reward received from the reward calculator 1620. The state updater 1810 may update the Q-table by using Update_Table (PrevS, Action, CurrS, Reward).

Here, PrevS denotes a previous state, Action denotes a power management operation, CurrS denotes a current state, and Reward denotes a reward. According to an embodiment, in order to provide an additional reward for better determination, a maximum value of a next state predicted by using Update_Table(PrevS, Action, CurrS, Reward) may be obtained.

The Q-learning described above is only an example, and one of ordinary skill in the art may utilize Q-learning by using various other variables, and a Q-value may be updated via a suitable formula.

The state generator 1820 may generate a current Q-state based on the hardware metrics and sensor data received.

The Q-table manager 1820 may update the Q-table based on the inputs received from the state updater 1810 and the state generator 1820. A state prior to a current process may be updated based on the determination made by a reward and a respective state. For the same Q-state, a random value may be selected. According to an embodiment, a power management operation selected for a given state may be determined by using any one of various methods, for example, a well-known algorithmic temperature function or Boltzmann Probability.

The embodiments may be written as computer instructions or programs stored in a computer-readable storage medium and may be implemented in computers or processors that execute the programs.

Examples of the computer-readable storage medium include electromagnetic storage media (e.g., ROM, floppy disks, hard disks, flash memory, solid-state drives (SSDs), etc.), optical recording media (e.g., compact disc read-only memories (CD-ROMs), or digital versatile discs (DVDs)), etc.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of managing power of an electronic device, the method comprising:
   obtaining operation information related to an operation from among operations performed by the electronic device, the operation being recognizable to a user via a product of hardware processing performed by hardware included in the electronic device;
   obtaining load information related to a load generated by the operation; and
   performing power management on the hardware included in the electronic device based on the operation information and the load information,
   wherein the performing of the power management comprises modifying an operating property of the hardware,
   wherein the load information comprises a load type determined according to a type of an application being executed by the electronic device,
   wherein the power management is performed according to the load type, and
   wherein the operation information includes a number of frames generated by the hardware per unit time.

2. The method of claim 1, wherein the modifying of the operating property comprises adjusting at least one of a voltage and a frequency of the hardware.

3. The method of claim 1, further comprising obtaining power consumption information of the electronic device,
   wherein the power management is performed on the hardware included in the electronic device based on the power consumption information.

4. The method of claim 1, wherein the performing of the power management comprises:
   obtaining feedback information regarding a power management performance result; and
   performing power management on the hardware based on the feedback information,
   wherein the feedback information comprises a change in the operation information.

5. The method of claim 1, wherein the performing of the power management comprises controlling the hardware to perform the operation recognizable to the user.

6. An electronic device comprising:
hardware configured to execute a process;
an output unit configured to output a process result of the hardware to a user; and
a controller configured to:
obtain operation information related to an operation from among operations performed by the electronic device, the operation being recognizable to the user via the process result of the hardware,
obtain load information related to a load generated by the operation, and
perform power management on the hardware based on the operation information and the load information,
wherein the controller is further configured to control the hardware to modify an operating property of the electronic device,
wherein the load information comprises a load type determined according to a type of an application being executed by the electronic device,
wherein the controller is further configured to perform the power management according to the load type, and
wherein the operation information includes information about a number of frames generated by the hardware per unit time.

7. The electronic device of claim 6, wherein the controller is further configured to adjust at least one of a voltage and a frequency of the hardware.

8. The electronic device of claim 6, wherein the controller is further configured to obtain power consumption information of the electronic device, and perform power management on the hardware based on the power consumption information.

9. The electronic device of claim 6, wherein the controller is further configured to obtain feedback information regarding a power management performance result, and perform power management on the hardware based on the feedback information,
wherein the feedback information comprises a change in the operation information.

10. The electronic device of claim 6, wherein the controller is further configured to control the hardware to perform the operation recognizable to the user.

11. A non-transitory computer-readable storage medium storing instructions which, when executed by a processor, cause the processor to perform operations comprising:
obtaining operation information related to an operation from among operations performed by an electronic device, the operation being recognizable to a user via a product of hardware processing performed by hardware included in the electronic device;
obtaining load information related to a load generated by the operation; and
performing power management on the hardware included in the electronic device based on the operation information and the load information,
wherein the performing of the power management comprises modifying an operating property of the hardware,
wherein the load information comprises a load type determined according to a type of an application being executed by the electronic device,
wherein the power management is performed according to the load type, and
wherein the operation information includes a number of frames generated by the hardware per unit time.

12. The non-transitory computer-readable storage medium of claim 11, wherein the performing of the power management comprises adjusting at least one of a voltage and a frequency of the hardware.

* * * * *